May 5, 1931.  L. G. TANDY  1,804,038
LOCOMOTIVE DRIVING CONNECTION
Filed Aug. 14, 1928
Fig: 1.
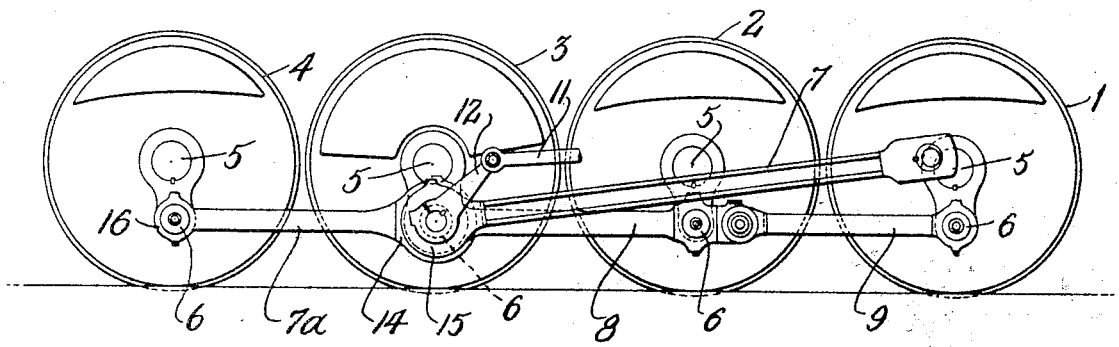
Fig: 2.
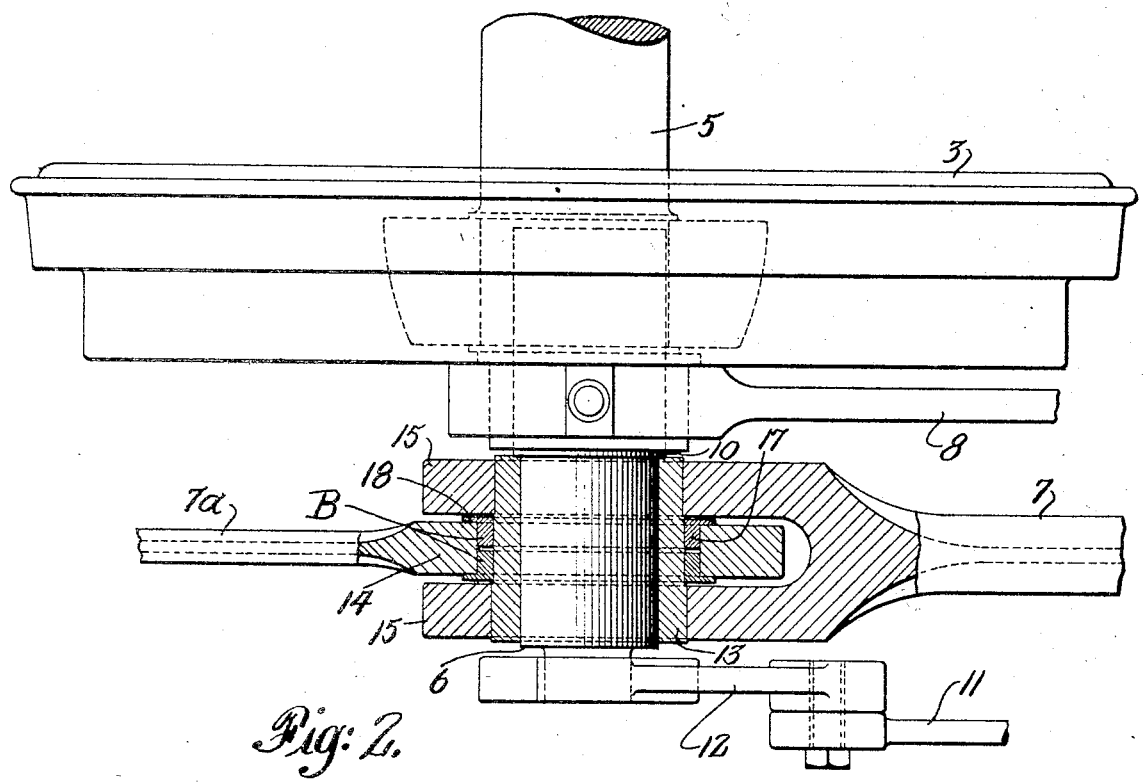
INVENTOR
Lewis George Tandy
BY
Lynnestvedt + Lechner
ATTORNEYS Patented May 5, 1931

1,804,038

UNITED STATES PATENT OFFICE

LEWIS GEORGE TANDY, OF NEW YORK, N. Y.

LOCOMOTIVE DRIVING CONNECTION

Application filed August 14, 1928. Serial No. 299,603.

This invention relates to locomotive driving connections, and more particularly to articulated rod constructions and bearing means for the joints thereof.

One of the primary objects of the invention is the provision of an improved connection for the parts of an articulated driving rod which will improve the operation thereof in service, prevent distortion of the parts, reduce wear and the cost of maintenance and repair, and minimize the likelihood of breakage.

Other objects of the invention are the minimization of friction in articulated joints of the character specified, and, in consequence, the obviation of overheating thereof.

In general, it is the purpose of the invention to accomplish the foregoing ends by providing means to prevent galling or chafing between the parts of an articulated driving rod and particularly between the eye of one section thereof and the fork of a connecting section.

How I accomplish the foregoing, together with such other objects and advantages as are incident to the invention or will occur to those skilled in the art, will appear clearly hereinafter, reference being had to the accompanying drawings, in which:—

Figure 1 is a somewhat diagrammatic side elevational view of a set of locomotive driving wheels having driving connections embodying the present invention; and Figure 2 is an enlarged plan view of the third driver of Fig. 1 with its associated driving connections, showing in section an articulated main rod connection embodying the invention.

In Figure 1 I have illustrated the four drivers on the right side of a locomotive, numbered from front to rear as 1, 2, 3 and 4, each having an axle 5 and a crank-pin 6. An articulated main rod or connecting rod 7, 7a, transmitting the thrust from the crosshead (not shown) distributes the same directly between a plurality of pins, in this instance the pins of numbers 3 and 4 drivers, in a manner now known in this art. Drivers 1 and 2 are driven through side rods 8, 9, from a portion 10 (here the inner portion) of the pin of driver number 3; while the usual eccentric rod 11 may be connected through the eccentric crank arm 12 at the outer end of said pin.

An articulated joint, as shown best in Fig. 2, is formed between the parts 7 and 7a of the main rod by means of the rigid steel bushing or sleeve 13, which extends through an eye in the head or end 14 of member 7a and is pressed into apertures formed in the two jaws 15, 15 of the forked head or end of member 7. The bushing or sleeve fits on pin 6 of No. 3 driver, while the end 16 of member 7a is apertured to fit pin 6 of No. 4 driver, thrust being transmitted to the latter not from No. 3 driver but from the steel bushing itself. To prevent undue friction and overheating, in general, and particularly to prevent galling of the head 14 in the jaws 15, I provide the following construction:

The eye in head 14 is made larger in diameter than the bushing 13, and said head is made of such contour, or of such thickness as to provide clearance on each side between it and the jaws 15. A split brass B is provided in the eye to form a bearing fit with it and with the bushing, each piece of such brass being formed as a ring 17 with a peripheral flange 18 at one side. These ring members are inserted, one from each side, in the eye, before the sleeve or bushing 13 is inserted. The portions 17 form an anti-friction bearing between the head 14 and the sleeve, and the flanges 18 form spacers between, and anti-friction bearings for, the adjacent faces of the eyed member and the forked or bifurcated member. The rings are made of such width as to provide some clearance between them, so that they will always be pressed all the way in, with their flanges lying flat against the sides of head 14.

The split ring construction has the advantage, in addition to those hereinbefore specified, of providing great facility for renewing the parts while yet insuring the proper retention thereof when they are in place.

What I claim is:

1. Locomotive driving connections including a pair of solid-end rod members, one having a bifurcated head and the other a head fitting in said bifurcation, each of said heads being apertured to receive a driving wheel pin, a hard sleeve pressed into the bifurcated head and extending through the aperture of the other head to articulate said heads, and an anti-friction member in one of said apertured heads, having an extension spacing adjacent lateral surfaces of said heads.

2. A multi-part main driving rod composed of unitary solid rod members, one member of which has a solid forked end, and an adjacent member of which has an eyed end fitted in said fork, a hard sleeve pressed into the forked end and extending through the eye to articulate said members, and means to prevent galling of the eyed end in the jaws of said fork.

3. A multi-part main driving rod composed of unitary solid rod members, one member of which has a solid forked end, and an adjacent member of which has an eyed end fitted in said fork, a hard sleeve pressed into the forked end and extending through the eye to articulate said members, and means to prevent galling of the eyed end in the jaws of said fork comprising anti-friction material positioned between adjacent faces of the jaws and eyed-end.

4. A driving rod structure comprising apertured solid-head rod members, a bushing extending through said apertures to form an articulated joint between the members, and an anti-friction device comprising a split brass, one part of which is insertable in the aperture of one of said members from one side and another part of which is insertable in said aperture from the other side, to form a bearing between the member and the bushing.

5. A driving rod structure comprising apertured solid-head rod members, a bushing extending through said apertures to form an articulated joint between the members, and an anti-friction device comprising a split brass, one part of which is insertable in the aperture of one of said members from one side and another part of which is insertable in said aperture from the other side, to form a bearing between the member and the bushing, and at least one of said parts having means preventing direct lateral contact between the said rod members.

6. In a multi-part locomotive driving rod of unitary solid-ended members, an articulated joint between members comprising an apertured forked end on one member, an eyed end on another member fitting between the jaws of the fork with lateral clearance, a sleeve pressed into said apertures and extending through said eye and bored to receive a driving-wheel pin, and anti-friction metal in said clearance space between adjacent faces of said members.

7. In a multi-part locomotive driving rod of unitary solid-ended members, an articulated joint between members comprising an apertured forked end on one member, an eyed end on another member fitting between the jaws of the fork with lateral clearance, a sleeve pressed into said apertures and extending through said eye and bored to receive a driving-wheel pin, and anti-friction metal in said clearance space between adjacent faces of said members and extending into said eye around said sleeve.

8. In a multi-part locomotive driving rod of unitary solid-ended members, an articulated joint between members comprising an apertured forked end on one member, an eyed end on another member fitting between the jaws of the fork with lateral clearance, a sleeve pressed into said apertures and extending through said eye and bored to receive a driving-wheel pin, and a split bearing member including a pair of rings, one of which extends into said eye from one side and the other of which extends into said eye from the opposite side.

9. In a multi-part locomotive driving rod of unitary solid-ended members, an articulated joint between members comprising an apertured forked end on one member, an eyed end on another member fitting between the jaws of the fork with lateral clearance, a sleeve pressed into said apertures and extending through said eye and bored to receive a driving-wheel pin, and a split bearing member including a pair of rings, one of which extends into said eye from one side and the other of which extends into said eye from the opposite side with clearance between the two.

10. In a multi-part locomotive driving rod of unitary solid-ended members, an articulated joint between members comprising an apertured forked end on one member, an eyed end on another member fitting between the jaws of the fork with lateral clearance, a sleeve pressed into said apertures and extending through said eye and bored to receive a driving-wheel pin, and a split bearing member including a pair of rings, one of which extends into said eye from one side and the other of which extends into said eye from the opposite side, each of said rings being flanged at its outer side.

In testimony whereof I have hereunto signed my name.

LEWIS GEORGE TANDY.